United States Patent
Behl

[11] Patent Number: 6,104,607
[45] Date of Patent: Aug. 15, 2000

[54] COOLING FAN FOR PC CARD SLOT

[75] Inventor: Sunny Behl, San Jose, Calif.

[73] Assignee: Inclose Design, Inc., San Jose, Calif.

[21] Appl. No.: 08/968,789

[22] Filed: Nov. 12, 1997

Related U.S. Application Data

[63] Continuation-in-part of application No. 08/811,119, Mar. 3, 1997, Pat. No. 5,862,037.

[51] Int. Cl.[7] .................................. G06F 1/20; H05K 7/20
[52] U.S. Cl. ......................... 361/687; 165/80.3; 361/695; 361/697; 415/213.1; 454/184
[58] Field of Search ..................................... 361/687, 695, 361/697; 165/80.3, 101–126; 454/184; 416/223 R; 415/177, 178, 213.1

[56] References Cited

U.S. PATENT DOCUMENTS

| | | | |
|---|---|---|---|
| 5,412,534 | 5/1995 | Cutts et al. | 361/695 |
| 5,475,563 | 12/1995 | Donahoe et al. | 361/695 |
| 5,636,103 | 6/1997 | Bushner | 361/695 |
| 5,689,654 | 11/1997 | Kikinis et al. | 361/686 |
| 5,694,294 | 12/1997 | Ohshi et al. | 361/687 |
| 5,898,568 | 4/1999 | Cheng | 361/687 |
| 5,978,219 | 11/1999 | Lin | 361/687 |

FOREIGN PATENT DOCUMENTS 8-206718  2/1998  Japan.

*Primary Examiner*—Gerald Tolin
*Assistant Examiner*—Lisa Lea-Edmonds
*Attorney, Agent, or Firm*—Kevin H. Fortin

[57] ABSTRACT

A card has a fan for cooling an electrical device such as a portable computer having a card slot. According to one embodiment, the card has a generally uniform thickness to enable the card to fully insert into the portable computer. According to another embodiment, the card has a fan cover, a filter and a grill which rotatably attaches to the fan cover to removeably hold the filter.

7 Claims, 6 Drawing Sheets

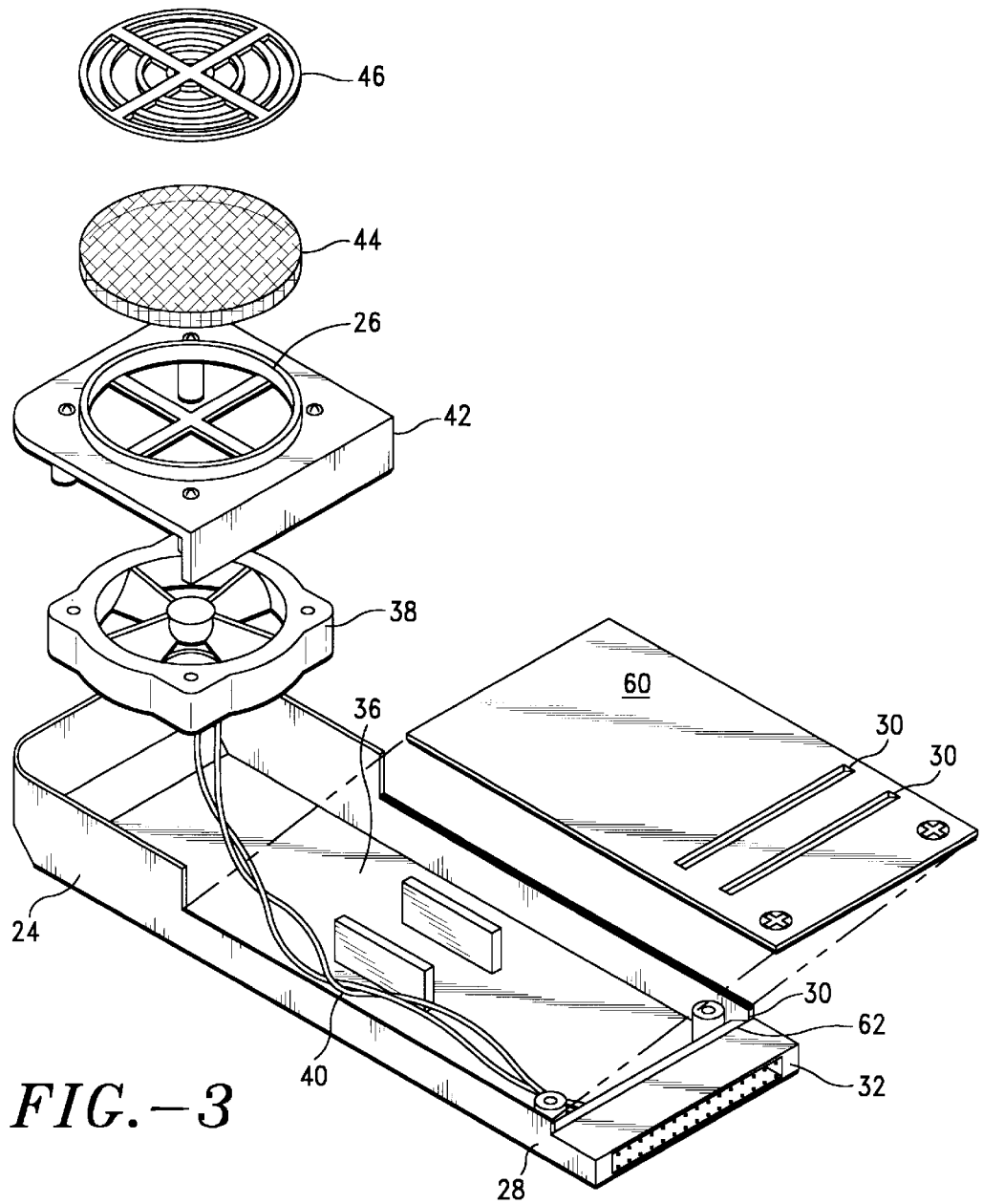
FIG.—3
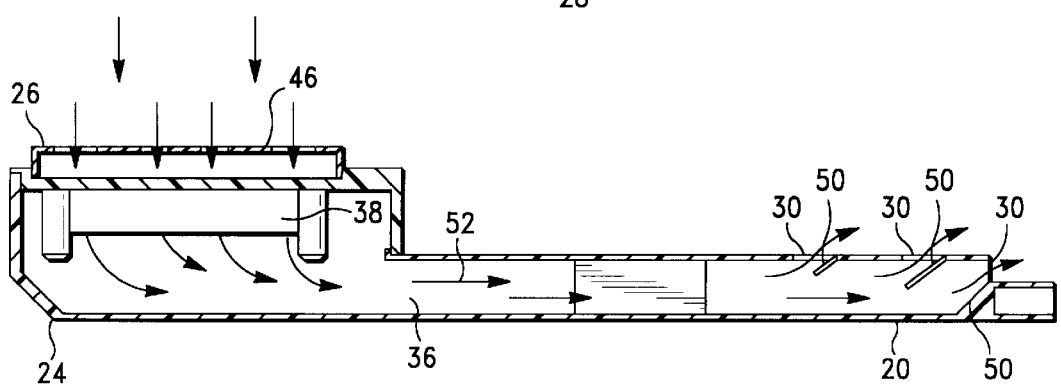
FIG.—4

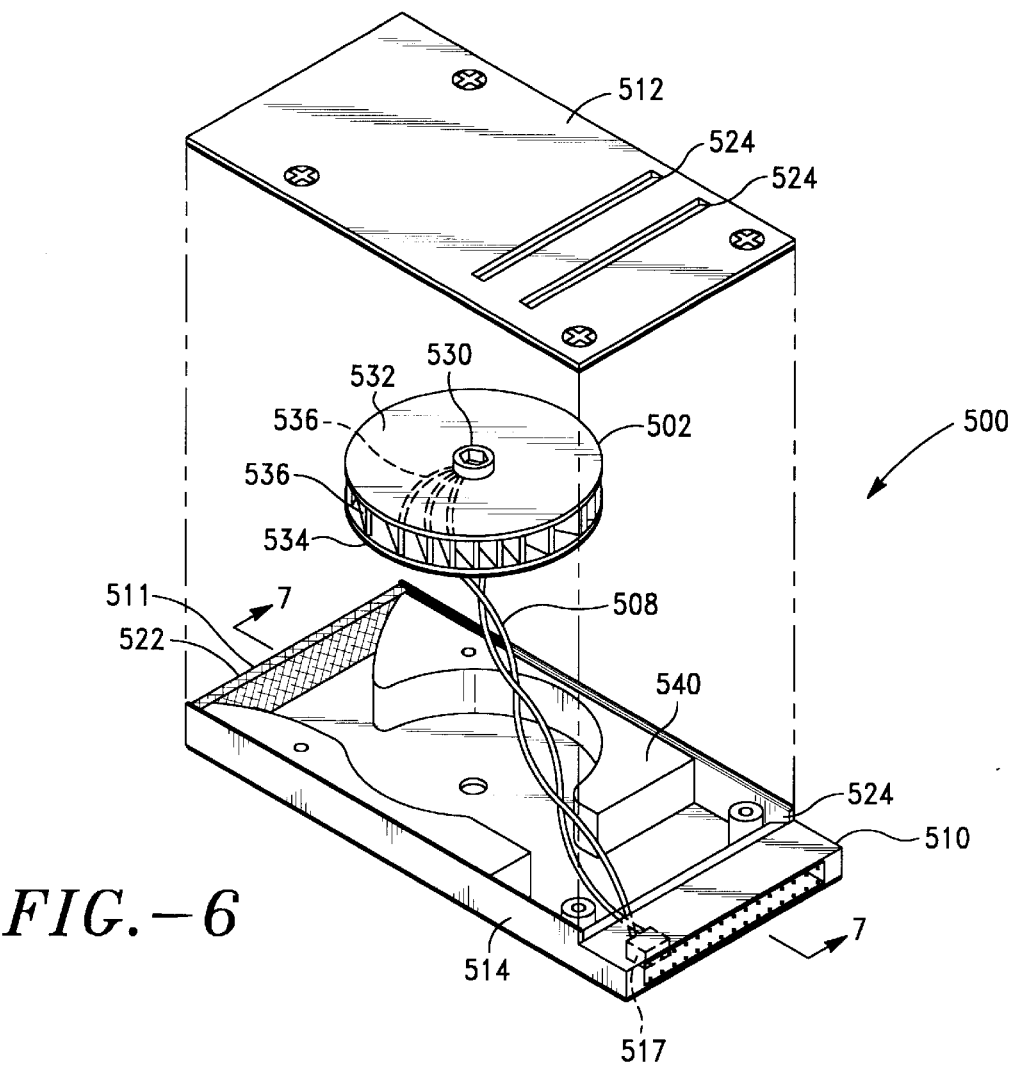
FIG.—6
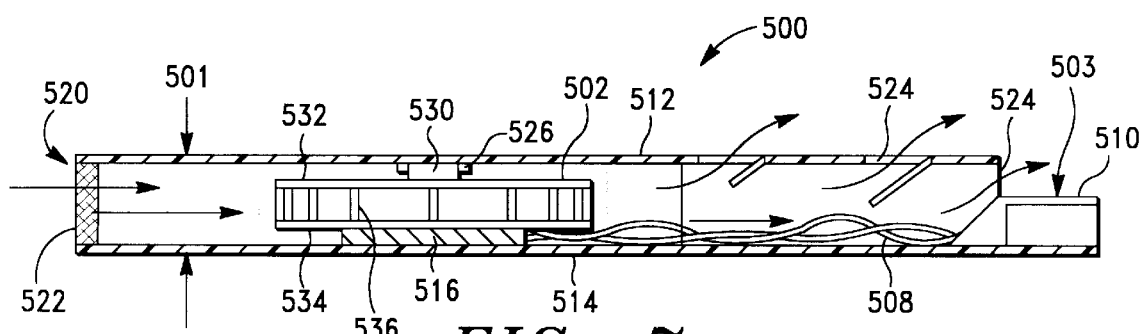
FIG.—7

6,104,607

COOLING FAN FOR PC CARD SLOT

CROSS-REFERENCE TO RELATED APPLICATION

This patent application is a continuation-in-part of application Ser. No. 08/811,037, now U.S. Pat. No. 5,862,037, filed Mar. 3, 1997.

FIELD OF THE INVENTION

This invention relates to fans which cool electronic devices such as portable computers and more particularly to PC card fans.

BACKGROUND OF THE INVENTION

In the early 1990's, the rapid growth of mobile computing drove the development of smaller, lighter, and more portable tools for information processing. One exciting innovation was the development of PC Card technology. The power and versatility of PC Cards quickly made them standard equipment in many mobile computers. The rapid development and worldwide adoption of PC Card technology has been due in large part to the standards efforts of the Personal Computer Memory Card International Association (PCMCIA).

The PCMCIA's PC Card Standard is now bringing the benefits of these same PC Cards to a variety of industries and vertical applications, including smart cards, set-top boxes, automobiles, and others. The PC Card technology's compact size and ruggedness make it the ideal technology for a wide variety of applications.

The present PC Card Standard provides physical specifications for three types of PC Cards, with additional provisions for extended cards. All three card types measure the same length and width and use the same 68-pin connector. The only geometrical difference between the card types is thickness. The thickness' are 3.3, 5.0, and 10.5 millimeters for Type I, Type II, and Type III cards respectively. Because they differ only in thickness, a thinner card can be used in a thicker slot, but a thicker card can not be used in a thinner slot.

The card types each have features that fit the needs of different applications. Type I PC Cards are typically used for memory devices such as RAM, Flash, OTP, and SRAM cards. Type II PC Cards are typically used for I/O devices such as data/fax modems, LANs, and mass storage devices. Type III PC Cards are used for devices whose components are thicker, such as rotating mass storage devices.

Extended cards allow the addition of components that must remain outside the system for proper operation, such as antennas for wireless applications.

The release number refers to the version of the PC Card Standard that a particular card or system was based on. Basically, release 1.0 supported memory only, and 2.X releases supported memory and I/O applications.

PCMCIA Standard Release 1.0/JEIDA 4.0—June 1990

The first release of the standard defined the 68-pin interface and the Type I and Type II PC Card form factors. The initial release of the PCMCIA Standard specified the electrical and physical requirements for memory cards only. It defined the Metaformat or Card Information Structure (CIS) that is critical to interoperability and plug-and-play for PC Cards. There was no concept of input/output (I/O) cards in the first release of the PC Card Standard.

PCMCIA Standard, Releases 2.0, 2.01 and 2.1—1991–1994

The second release of the standard defined an I/O interface for the same 68-pin interface as was used for the PCMCIA memory cards in the first release of the Standard. Release 2.0 also added various clarifications to the first release, support for dual-voltage memory cards, and sections dealing with card environmental requirements and test methods. Release 2.01 added the PC Card ATA specification, the Type III card type, and the Auto-Indexing Mass Storage (AIMS) specification geared toward digital images was also added. It also included the initial version of the Card Services Specification. Release 2.1 further enhanced the Card and Socket Services Specification, and made improvements to the Card Information Structure.

PC Card Standard-February 1995

The latest release of the PC Card Standard added information to improve compatibility and added support for features such as 3.3 volt operation, DMA support, and 32-bit CardBus busmastering.

The rapid rate of adoption of PC Card slots has driven a steady stream of card and host implementations. During that time, PC Cards containing new technologies were introduced and significant new capabilities were added to the Standard. At the same time considerable experience was gained by card, host, and software vendors, and opportunities to improve compatibility were recognized.

PCMCIA's goal is to make the technology as easy to use as possible, however, the Standard can only provide guidelines in some areas so there will be manufacturers who do not follow the Standard exactly or have interpreted it differently. Therefore, development planned for flexibility and adaptability allows for the greatest compatibility.

Three major factors that have greatly improved PC Card interoperability. In the March 1995 release of the standard, the software specification for PC Cards were improved in a number of ways. Improvements to the Card Information Structure and the guidelines for its usage improved the way that hosts recognize the features and requirements for a card when inserted. Also part of the March 1995 release was the addition of the Guidelines document, a series of recommended guidelines for developers of specific types of PC Cards, such as modems, wireless devices, ATA cards and CardBus cards.

In addition, increasing cooperation between card, host and software developers within the industry has resulted in improved interoperability. Towards this end, PCMCIA and the Plug and Play Association regularly co-sponsor PlugFest Interoperability Workshops that bring together leading manufacturers from all parts of the industry. Additional advancements are expected.

Problems still face portable computer manufactures and users. One major problem is heat buildup. This is due to the fact that many electronic devices are compacted into a small case. The INTEL PENTIUM® class processor, for example, is known for generating excessive amounts of heat. Other processors generate more heat.

Disk drives, and other components, also generate significant amounts of heat. In a small case such as a laptop computer, these and other devices can overheating and ultimately, failure of the portable computer. Overheating may also decrease the mean time between failure of electronic components. What is desired is a convenient way to cool portable computers.

SUMMARY OF THE INVENTION

The present invention includes a PC card having a cooling fan and a generally uniform thickness. The generally uniform thickness enables the card to fully insert into a standard PCMCIA card slot of a portable computer or other electronic device.

An apparatus for cooling an electronic device having a card slot, comprising:

a card having a first end, a generally uniform thickness, and a second end with at least one air vent, the card defines an air conduit between the first end and the vent;

the second end being insertable into a card slot for positioning the vent in the card slot;

a fan attaching between the ends for blowing air through the air conduit and the vent to direct air though the card slot and to cool the electronic device.

The fan mounts centrally within the card and the card encloses the air conduit to enable the card to direct air from the fan. The generally uniform thickness of the card enables full insertion of the card into the card slot. During full insertion, the card overhangs the electronic device by no more than three centimeters. Preferably when the card fully inserts into the card slot, the card overhangs the electronic device by no more than one centimeter.

The generally uniform thickness of the card is between 3.3 to 10.5 cm, preferably between 3.3 to 5 cm. The second end is relatively thinner than the generally uniform thickness to enable the second end to insert into a card slot connector.

The fan mounts centrally positioned within the card. The shape of the fan is generally cylindrical. The fan has a planar top and bottom surface and fins which extend between these surfaces. The fins are arcuate to direct air radially outward from the fan.

The card has a housing with vents and a contoured interior which cooperate with the fan to direct air out of the vents. The countered interior surrounds portions of the cylindrical shaped fan to direct air out through the vents.

BRIEF DESCRIPTION OF THE DRAWING

For a further understanding of the advantages of the present invention, reference should be given to the following detailed description, taken in conjunction with the accompanying drawing, in which like parts have like reference numerals and wherein:

FIG. 3 is an exploded view of the cooling apparatus of FIG. 2.

FIG. 4 is a cross-sectional view of the cooling apparatus of FIG. 2.

FIG. 6 is a card in accordance with the present invention.

FIG. 7 is a side cross sectional view of the card of FIG. 6 as seen along the line 7—7.

DETAILED DESCRIPTION

Figure 1:
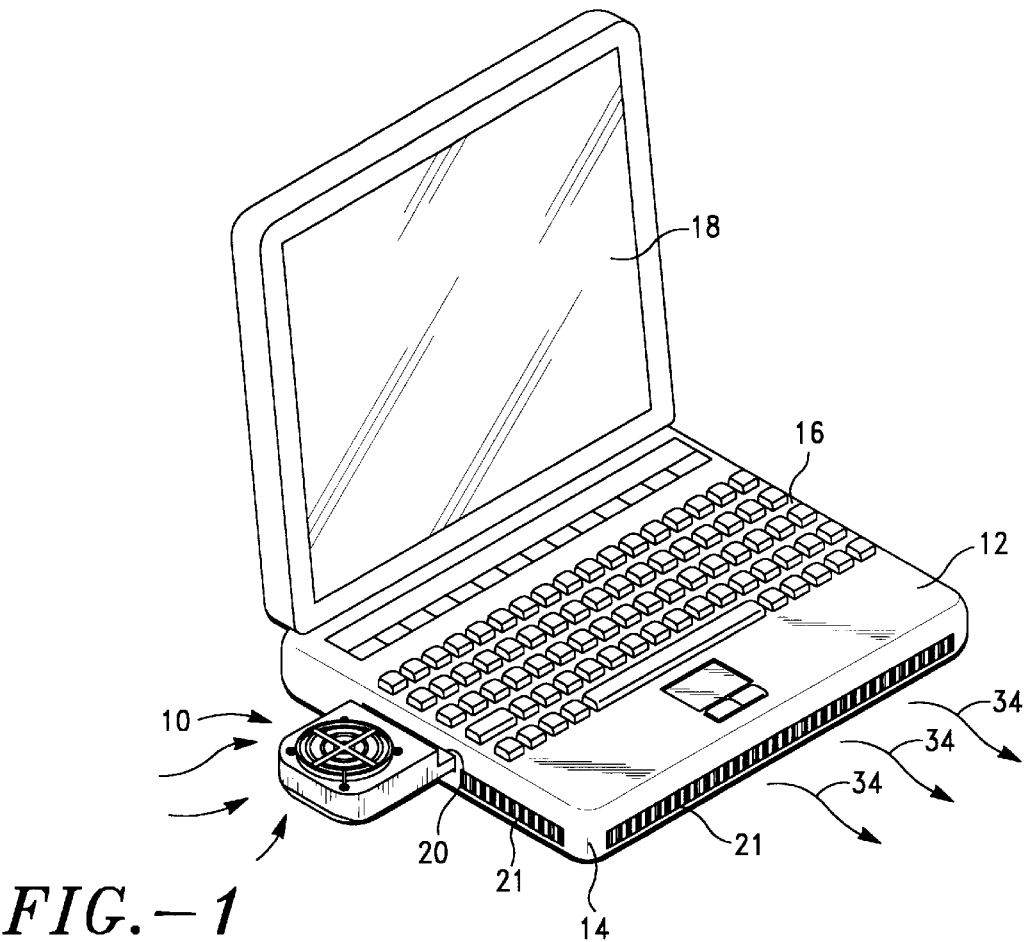
FIG. 1 is a perspective view of the present invention.

FIG. 1 shows a cooling apparatus, generally designated with the reference numeral 10, attached to a portable computer 12 in accordance with the present invention. The portable computer 12 includes a base 14, a viewing screen 18, a keyboard 16. The base 14 includes and a PC card slot 20. The viewing screen 18 foldably attaches to the base 14 and folds to cover the keyboard 16 and enable portability of the computer.

The PC card slot 20 is made in accordance with PCMCIA PC card standards. According to one aspect of the invention, the PC card slot is adapted for PCMCIA Type III PC cards. According other aspects of the invention, the PC card slot is adapted for Type II and Type I PC cards, respectively.

The computer 12 includes vents 21. The cooling apparatus 10 blows relatively cool air into the PC card slot 20 to convectively cool the computer 12. The cooling apparatus 10 pushes hot air out from the vents 21 in the direction of the arrows 34.

In an alternate embodiment, the computer 12 has a non-air tight base which allows air blown by the cooling apparatus 10 to escape the computer 12. Accordingly, the cooling apparatus 10 may be retrofit on to virtually any portable computer having a PC slot. The cooling apparatus 10 may be used with virtually any device having a PC slot.

As the PCMCIA standards evolve, it can be appreciated, that a the present invention may be adapted to any of a variety of variety of newly evolved PC card slots 20 to cool the portable computer 12. Additionally, the present invention may be used in a variety of other applications beyond the use in a computer e.g. set-top boxes, automobiles and any other application where PC cards may be used.

Figure 2:
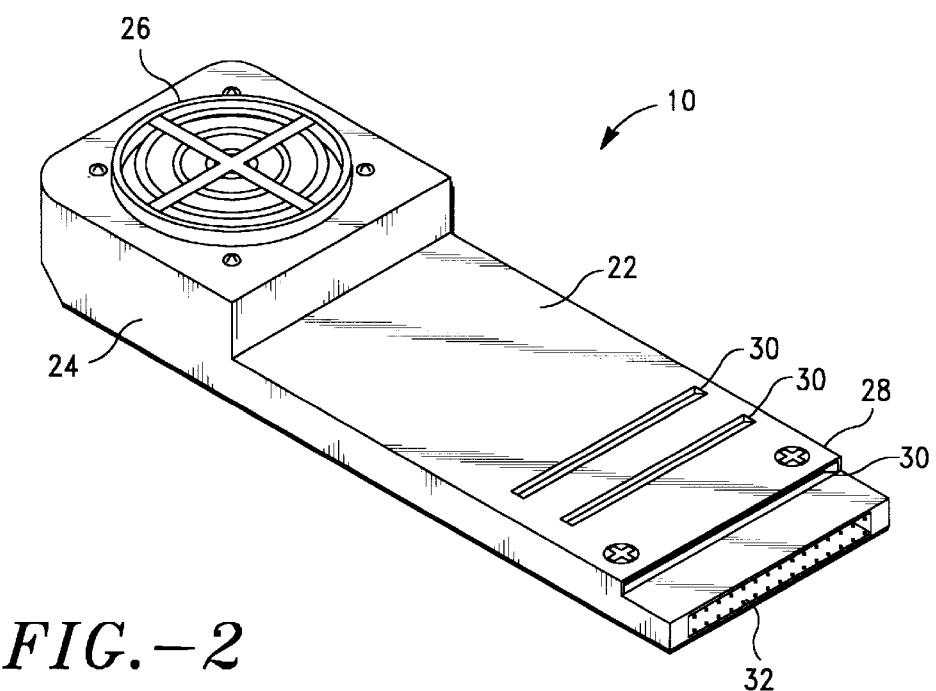
FIG. 2 is a perspective view of the cooling apparatus of FIG. 1.

FIG. 2 shows an embodiment of the cooling apparatus 10 in accordance with the present invention. The apparatus 10 includes a hollow card 22. The card 22 has a first end 24 with an air inlet 26. The card 22 has a second end 28 with at least one air vent 30.

The second end includes an electrical connector 32. The connector 32 is a standard PCMCIA PC card connector having 68 pin contacts which attach the card 22 to the portable computer 10 (FIG. 1). The connector 32 holds the card vents 30 within the PC slot. The vents 30 direct air into the portable computer 12 to cool the computer 12 when the card 22 connects to the PC slot 20 (FIG. 1) and the fan operates.

FIG. 3 shows the cooling apparatus 10. The card 22 includes an air conduit 36 which extends between the first end 24 and the second end 28.

The card 22 includes a fan 38. The fan 38 attaches to the first end 24 for blowing air through the air conduit 36. When, for example, the fan 38 draws air through the air inlet 26, the fan forces the air through the air conduit 36 and out of the second end 28 via the vents 30.

The fan 38 includes a lead 40 which couples the fan 38 to the electrical connector. The electrical connector 32 rigidly mounts on the second end 28 of the card. The fan 38 rigidly mounts on the first end 24 of the card 22. When the electrical connector 32 attaches to the PC slot 20 of the computer 12 (FIG. 1), and the computer 12 operates, the connector 32 delivers power to the fan 38.

The fan 38 removeably attaches to the first end 24 of the card 22. Removable attachment enables the fan to be replaced, repaired or cleaned as necessary.

According to one aspect of the invention, the cooling apparatus includes a fan mount 42 which attaches the fan 38 to attach to the card 22. The fan mount 42 includes a grill 46 and an air filter 44. The grill 46 and the air filter 44 protect the fan 38. The fan 38 filters air to minimize dust buildup within the computer 12. The grill 46 snaps on an off to ease removal of the air filter 44 for cleaning.

The includes a top face 60 and an end face 62, the top face defines a pair of fins and vents 30, the fins direct air from the fan 38 through the vents, the end face 62 defines the vent 30.

FIG. 4 shows air flow though the cooling apparatus 10. The fan 38 operates continuously and rotates to draw air into the inlet 26 of the first end. The fan forces air through the air conduit to the second end 28. Air exits the second end 28 through the vents 30. Each vent 30 includes a vent fin 50. The fins 50 attach to the vents 22 within the air conduit 30. The vent fins 50 are angled with respect to the air flow direction 52 within the conduit to direct air outwards from the vents 30.

Although the fan 38 directs air out through the vents 30 as shown, it can be appreciated that the fan can be reversed to also draw air into the vents 30 and out through the first end 24.

Figure 5:
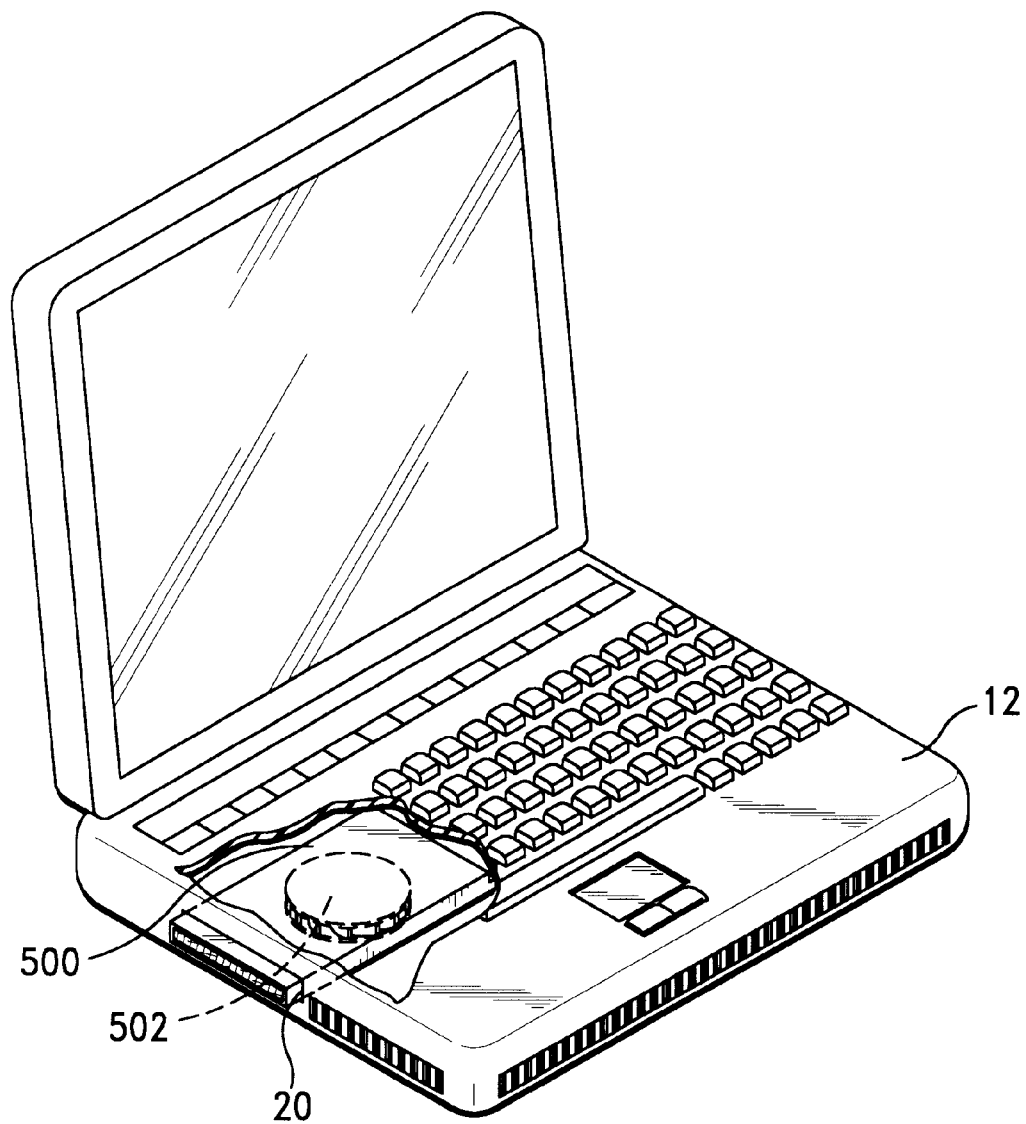
FIG. 5 is a portable computer having a card in accordance with the present invention.

FIG. 5 shows a portable computer 12 having a PC slot 20 and a card 500. The card 500 inserts fully into the PC slot 20. The card 500 includes a fan 502. Full insertion of the card 500 into the PC slot enables the portable computer 12 to enclose the fan 502. Full insertion of the card 500 protects the card and the PC slot of the computer from damage. Full insertion, it can be appreciated, allows slight overhang of the card 500 from the personal computer enables the personal computer to only partially cover the card, this preserves satisfactory airflow through the portable computer 12. The card 500, when fully inserted into the computer 12, extends no more than three centimeters out of the computer 12. Preferably, the card 500 extends only a few millimeters out from the computer 12 to enclosed the card 500 and protect the card from damage.

FIG. 6 shows an exploded view of the card 500. The card 500 includes a housing 514 with a top cover 512, a first end 511 and a connector 510. The card 500 also includes a fan 502, a fan motor 516 (FIG. 7), and leads 508. The card 500 encloses an air conduit 540.

The air conduit 540 extends between the end 511 and the connector 510. The air conduit 540 is contoured to partially circumscribe the fan and to enable air flow between the end 511 and the vents 524. It can be appreciated that this invention can be adapted to have air flow in a single direction, or more than one direction, e.g. opposing directions. Modifications such adapting the fan type, blade shape and housing interior 540 will also effect air flow though the housing 514.

The fan 502 mounts centrally within the housing 514 so that the housing 514 encloses the fan 502. Enclosing the fan 502 within the card 500 reduces distance between the fan and an area within the computer 12 to be cooled e.g. a central processor, dampens fan noise, and hides the fan from view.

The connector 510 is formed integral with the housing 514. The leads 508 couple with the connector 510 to deliver power to the fan motor 516.

The card 500 includes a heat sensor 517. The heat sensor 517 attaches to the card 500 near the connector 510. The heat sensor 517 includes a power switch. The power switch couples with the fan and automatically operates so that when the heat sensor 517 detects temperatures exceeding a predetermined range, the sensor causes the switch to automatically turn the fan on and off. Accordingly, the card 500 enables the portable computer 12 to maintain a desired internal operating temperature range.

In an alternate embodiment, the heat sensor is adapted to notify a user when the temperature exceeds a predetermined range. The fan couples to a manually operable switch. The sensor 517 signals the user when the portable computer 12 (FIG. 5) exceeds a desired operating temperature. The user operates the switch to turn the fan 502 on and off.

FIG. 7 shows the card 500 in cross-section as seen along the line 7—7 in FIG. 6. The card 500 has a profile thickness 501. The profile thickness 501 is generally uniform and within the range of 3.3 and 10.5 mm. According to one aspect of the invention, the profile thickness 501 is between 3.3 and 5 mm. The connector 510 has a thickness 503 which is slightly less than the thickness 501 of the profile.

The fan motor 516 mounts on the housing 514. The top cover 512 attaches to the housing 514 to hold the fan 502 and the fan motor 516 within the housing 514. The housing 514 has an open end 520, an air filter 522 and vents 524. The air filter 522 removeably press-fits in the open end 520. The fan motor 516 rotates the fan 502 to draw air in through the open end 520 and out through the vents 524.

The top cover 512 is flat, having an exterior surface and an interior surface. The interior surface has a lubricated bearing surface 526. The fan 502 has a cylindrical axle 530. The axle 530 rotates during fan operation. The bearing surface 526 holds the axle 530 of the fan 502 during fan 502 rotation.

The card 500 is sized and powered in accordance with PCMCIA standards (e.g. type I, II and III card standards) so that in operation, the card 500 readily inserts into an operating portable computer 12 (FIG. 5). According to one aspect of the invention, the fan operates on 3.3 volts. Alternatively, the card includes a 5.0 volt fan.

The fan 502 is cylindrical in shape having a planar top surface 532 and planar bottom surface 534. The fan 502 has blades 536 attached between the planar top and bottom surfaces 532, 534. Each blade 536 is arcuate to direct air radially outward from the fan 502 during operation. (see FIGS. 6 & 7)

Figure 8:
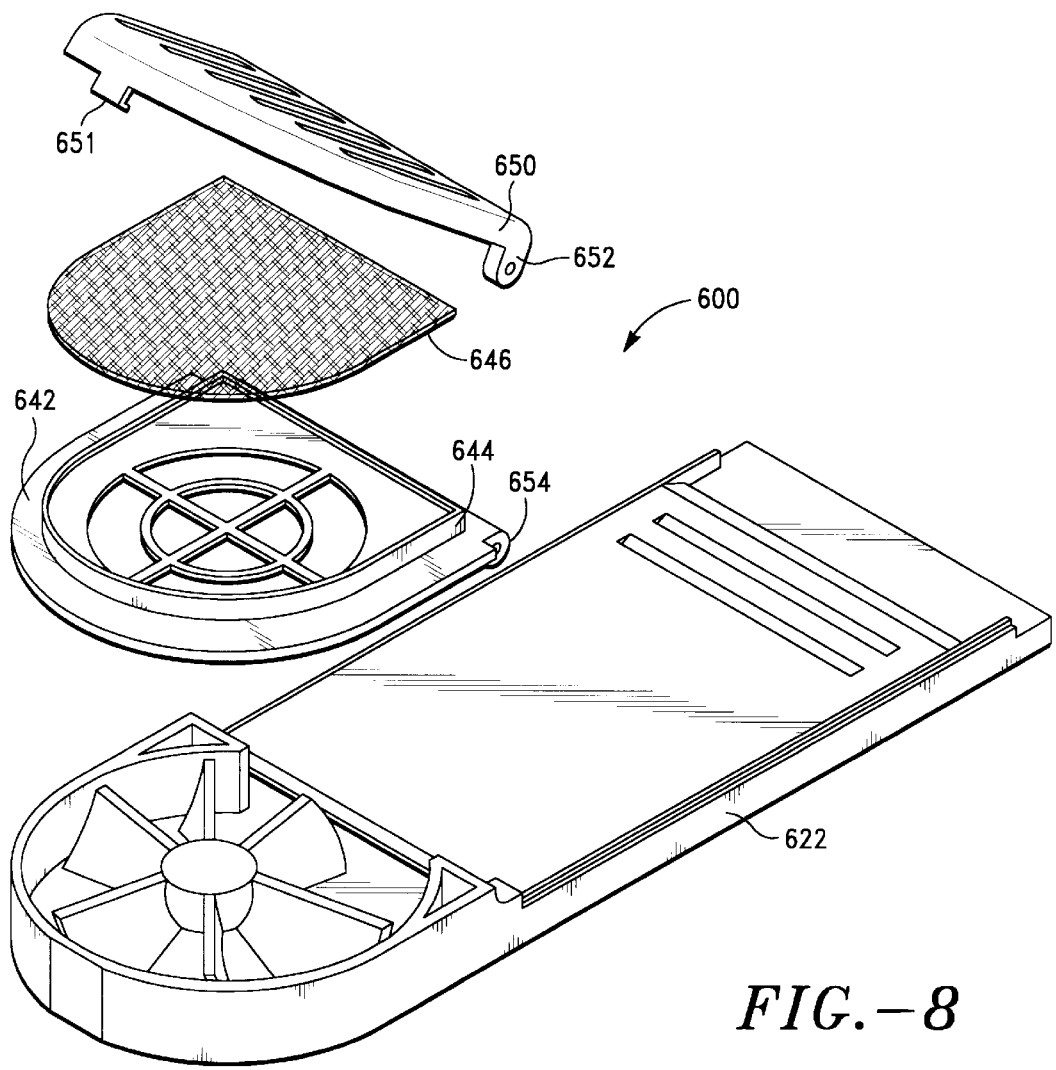
FIG. 8 is an exploded perspective view of a card in accordance with the present invention having a folding cover.
Figure 9:
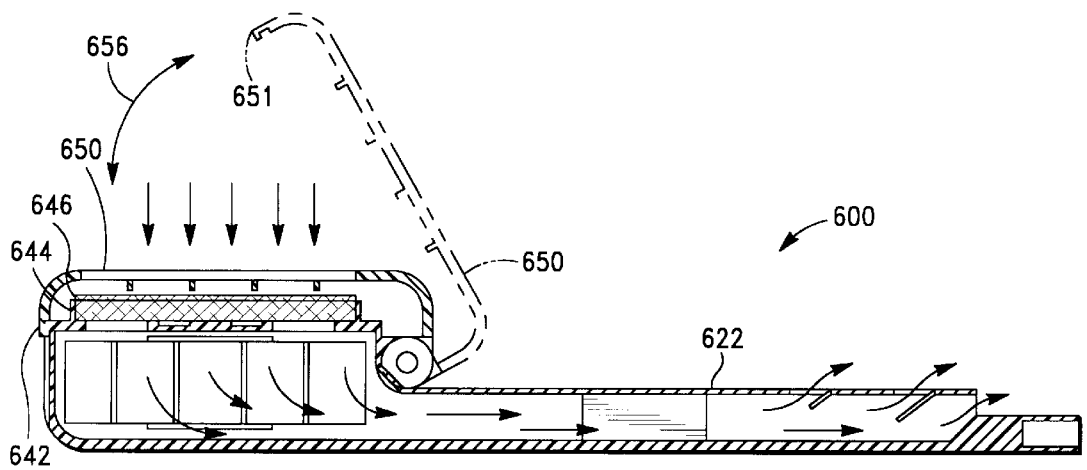
FIG. 9 is a cross-sectional side view of the card of FIG. 8.

FIGS. 8 and 9 show an embodiment of the cooling apparatus, generally designated with the reference numeral 600 of FIG. 1. The apparatus 600 includes a hollow card 622. The card 622 includes a fan 638 mounted on the card and a fan cover 642. The fan cover 642 holds the fan on the card 622. The fan cover includes a ridge 644 and an air filter 646. The ridge 644 holds the filter 646 and inhibits lateral movement of the filter 646.

The card 622 includes a grill 650. The grill 650 cooperates with the ridge 644 to hold the filter 646. The grill 650 rotatably attaches to the fan cover 642. Rotatable attachment of the grill 650 enables removal and replacement of the filter 646. According to one aspect of the invention, the grill 650 includes hinges 652 and the fan cover 642 includes hinges 654. The hinges 652 and 654 mate to enable the grill 650 to rotate.

The grill 650 includes a snap 651 to hold the grill in a closed position on the fan cover 642. The grill 650 is shown closed in FIG. 9, against the fan cover 642. The grill 650 opens as shown in phantom. The grill 650 rotates between an open and closed position in the direction of the arrows 656 to enable removal and replacement of the filter.

Figure 10:
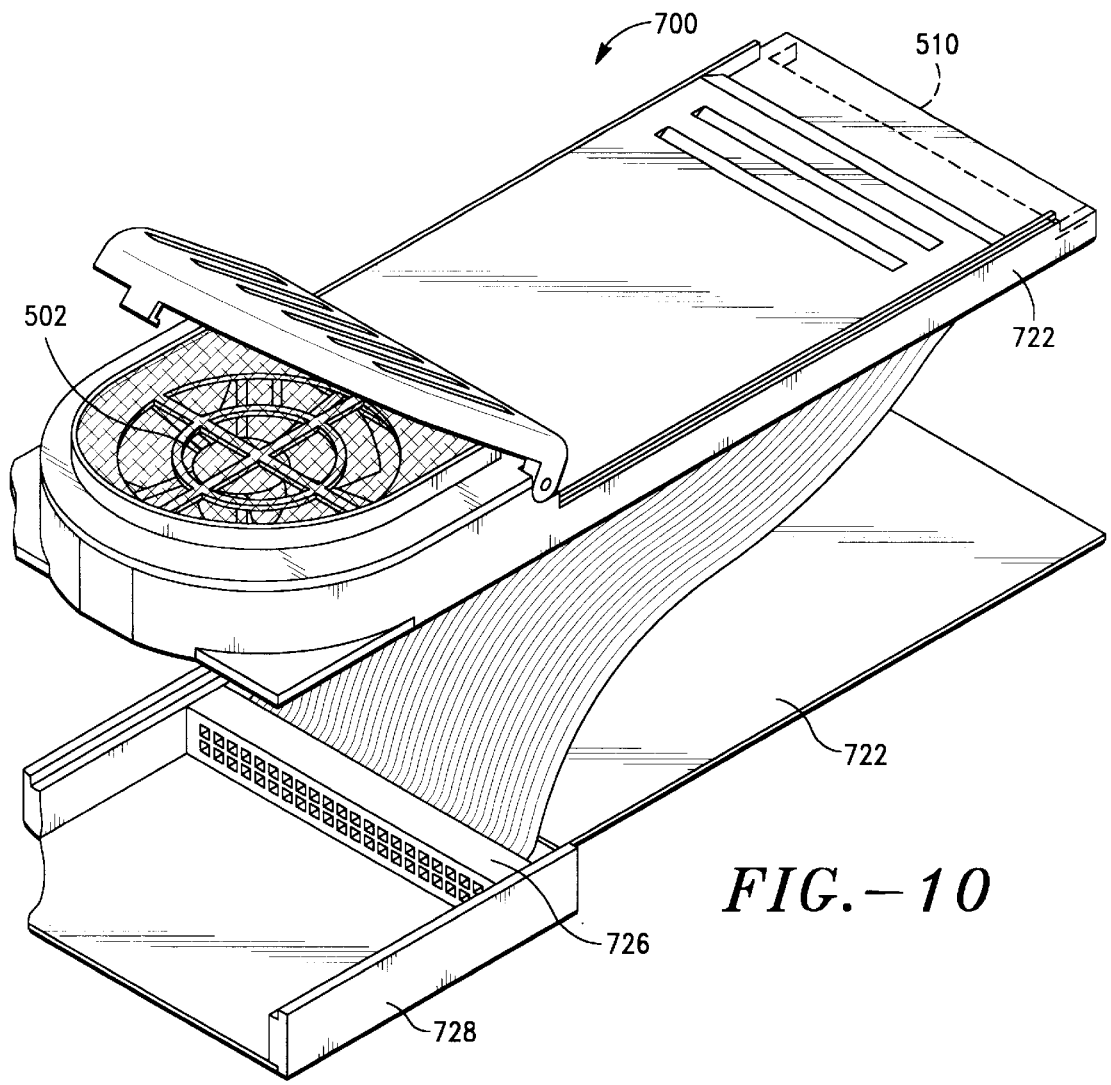
FIG. 10 is an exploded perspective view of a card in accordance with the present invention having a card adaptor.
Figure 11:
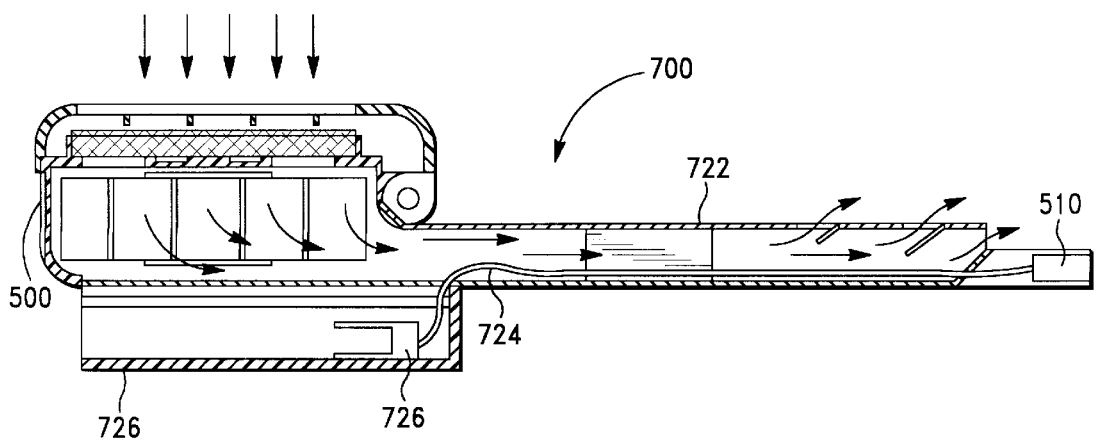
FIG. 11 is a cross-sectional side view of the card of FIG. 10.

FIG. 10 and FIG. 11 show an embodiment of the cooling apparatus 700. The cooling apparatus 700 includes a card 722. The card 722 encloses a ribbon cable 724. The card include the connector 510 and a connector 726. The ribbon cable 724 couples the connector 726 and the connector 510. The connector 726 mounts adjacent the fan 502 to enable a card such as a PCMCIA card to insert into the cooling apparatus 700. The card 722 includes a card slot 728 surrounding the connector 726. According to one aspect of the invention, the card slot 728 is a PCMCIA card slot. Alternatively, the card slot 728 is adapted for any of a number of card configurations so that the card 700 functions as a card adapter. Accordingly the cooling apparatus 700 simultaneously provides a card slot and convective cooling.

While the foregoing detailed description has described several embodiments in accordance with the present invention, the reader should understand that the above description is illustrative only and not limiting of the disclosed invention. It will be appreciated that the embodiments discussed above and the virtually infinite embodiments that are not mentioned could easily be within the scope and spirit of this invention. For example the air conduit may be enclosed by the card, partially exposed, or fully exposed so that the fan blows unguided air at the card slot. Thus, the invention is to be limited only by the claims as set forth below.

What is claimed is:

1. An apparatus for cooling an electronic device having a card slot, comprising:

a card having a first end, a second end with at least one air vent, and a generally uniform thickness to enable full insertion of the card into the card slot;

the card defines an air conduit between the first end and the vent;

the second end being insertable into a card slot for positioning the vent in the card slot; and a fan mounted centrally within the card between the ends for blowing air through the air conduit and the vent to direct air though the card slot and to cool the electronic device wherein the card has a geometry conforming to PCMCIA Type III geometry specifications.

2. An apparatus for cooling an electronic device having a first card slot, comprising:

a card having a first end, and a second end with at least one air vent, the card defines an air conduit between the first end and the vent;

the first end includes a second card slot to enable connection of a PCMCIA card;

the second end being insertable into the first card slot;

a fan attached to the card for blowing air through the air conduit to cool the electronic device;

a fan cover attached to the first end, for protecting the fan, and a folding grill attached to the fan cover; and an electrical connector mounted on the second end, being connectable with the first card slot and being coupled to the fan for enabling the first card slot to power the fan, and being coupled to the second card slot.

3. An apparatus as set forth in claim 2, further an air filter, the fan cover and the folding grill cooperate to hold the air filter.

4. An apparatus as set forth in claim 3, wherein the fan cover includes a ridge, the ridge holds the air filter.

5. An apparatus as set forth in claim 3, wherein the grill includes hinges and a snap, the hinges rotatably mount the grill on the fan cover, the grill rotates between an open position and a closed position, the snap selectively locks the grill in the closed position.

6. An apparatus as set forth in claim 3, further comprising a ribbon cable, the ribbon cable couples the second card slot with the first card slot.

7. An apparatus for cooling an electronic device having a first card slot, comprising:

a card having a first end, and a second end with at least one air vent, the card defines an air conduit between the first end and the vent;

the first end includes a second card slot to enable connection of a PCMCIA card;

the second end being insertable into the first card slot;

a fan attached to the card for blowing air through the air conduit to cool the electronic device; and an electrical connector mounted on the second end, being connectable with the first card slot and being coupled to the fan for enabling the first card slot to power the fan, and being coupled to the second card slot.

* * * * *